M. A. BAKER.
ROPE SHEAVE.
APPLICATION FILED FEB. 27, 1908.

899,648.

Patented Sept. 29, 1908.

Witnesses:—
Frank L. A. Graham
Louis W. Gratz.

Inventor:
Milo A. Baker:
by Townsend Lyon & Hackley
his Attys.

UNITED STATES PATENT OFFICE.

MILO A. BAKER, OF LOS ANGELES, CALIFORNIA.

ROPE-SHEAVE.

No. 899,648.  Specification of Letters Patent.  Patented Sept. 29, 1908.

Application filed February 27, 1908. Serial No. 418,161.

*To all whom it may concern:*

Be it known that I, MILO A. BAKER, a citizen of the United States, residing at Los Angeles, in the county of Los Angeles and State of California, have invented a new and useful Rope-Sheave, of which the following is a specification.

One of the objects of my invention is to provide a sheave which may be used for transmitting power by cable or wire rope direct or which may be adapted to be used to transmit power by means of the ordinary rope or fibrous cable.

Another object of the invention is to provide a pulley which is peculiarly adapted to be used in drilling wells, and especially oil wells, where great depth is frequently necessary and wire cable is substituted at the greater depths for the ordinary rope that is generally used for the shallower depths.

I accomplish these objects by grooving the periphery of the sheave circumferentially, as will be hereinafter more fully set forth.

Figure 1:
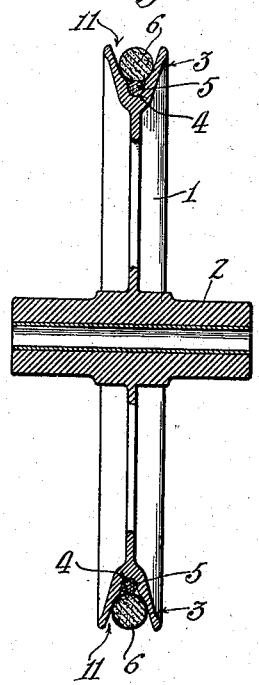
Figure 2:
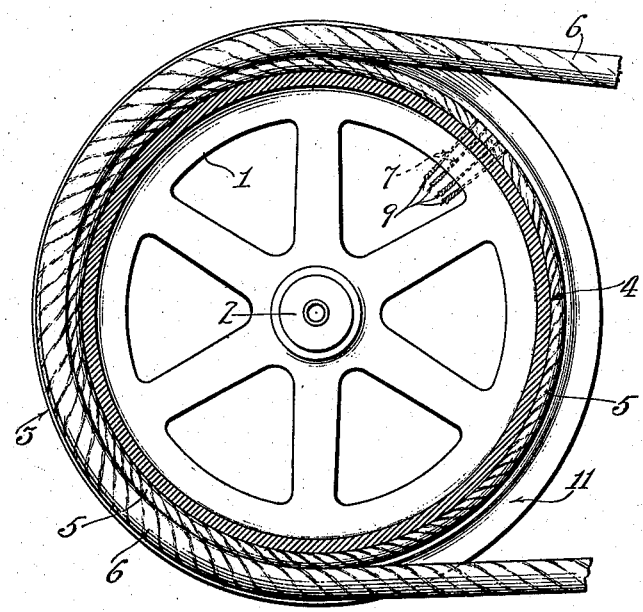

In the accompanying drawings which illustrate the invention; Figure 1 is a transverse, vertical, sectional view of a pulley made in accordance with my invention. Fig. 2 is a similar view taken at right angles to Fig. 1, and Figs. 3, 4 and 5 are enlarged sectional views, each of a section of the rim of the pulley.

Referring more particularly to the drawings; 1 indicates a pulley which may be of any suitable size and internal construction and provided with a suitable hub 2. The periphery or rim 3 of the pulley is grooved circumferentially, as shown at 4, within which a yielding packing 5 is seated, a portion of its surface projecting radially outward a sufficient distance to be engaged by the transmitting element, as a cable 6, which is adapted to be placed upon the rim in any suitable manner.

In the drawings, the rim is shown as flaring or V-shape in cross section for the reception of the cable 6, and the groove 4 is formed at the bottom of the outer groove, and the packing 5, which preferably consists of a piece of rope or twisted material, is removably secured in position in any suitable manner, as by means of wire clamps 7 which are passed through perforations 8, after having engaged with the packing, and have their free ends twisted together upon the interior of the rim, as shown at 9. Where a single piece of packing is used, as shown in the drawings, a plurality of perforations 8 are formed adjacent to each other so that by passing the packing or rope 5 around within the groove 4 with its ends abutting each other between said perforations the desired number of wires 7 may be passed over the packing to rigidly secure it in position and prevent its "creeping" or moving around the pulley from the strain or pressure of the transmitting cable 6.

Figure 3:
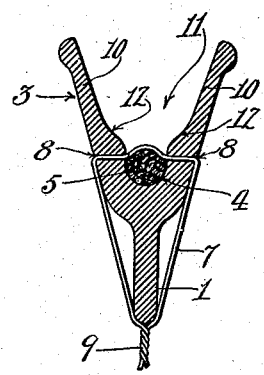

The mouth or outer portion of the groove 4 is equal to or greater than the cross section at any other point so as to permit of the insertion or removal of the packing without changing or varying the pulley in any manner whatever except the manipulation of the clamping wires 7, and the perforations 8 are located at a point between said mouth and the bottom of the groove so as to cause the wires to press down upon the outer portion of the packing as shown more particularly in Fig. 3, and thereby hold it very firmly within the groove.

Figure 4:
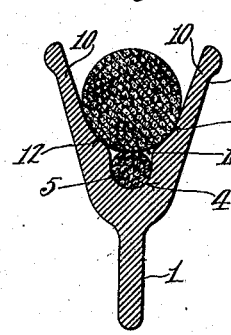
Figure 5:
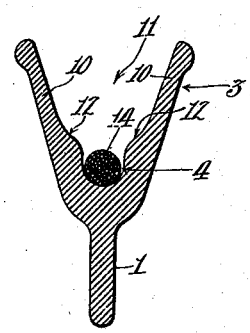

The sides or walls 10 of the main or outer groove 11 of the pulley are preferably curved toward each other, as shown at 12, so as to afford as great a seat or bearing surface as possible for the cable 6 and the walls of the groove 4 are preferably substantially parallel or slightly flaring as shown in Fig. 4, so as to permit of the easy insertion or removal of the packing, if desired. The groove 4 extends inward from the bottom of the groove 6 toward the hub of the wheel to a distance preferably less than the diameter of the packing which is to be seated therein so as to cause a portion of the surface of said packing to extend out from said groove into a position where it can be engaged by the inner surface of the cable 6 to any desired extent to thereby increase the friction or tractive effect of the cable 6 in transmitting power to the pulley or receiving it therefrom. In other words, the depth and curvature of the two circles forming said seat and groove, respectively, are of such size and in such location that if extended they would intersect each other to a greater or less extent and thereby cause the engaging surfaces of the packing and the cable to be flattened to a certain extent, or approaching the chord common to the intersecting points of said circles, as indicated more clearly at 13 in Fig. 4. By constructing a pulley in this manner, its transmitting power is very considerably increased without weakening its structure in any manner and adding but a trifle to its cost.

If it be desired to use the pulley for what is known as wire rope transmission wherein a wire cable 14 is used in place of the cable 6, the packing 5 may be omitted from the pulley or removed therefrom and the cable 14 caused to engage directly with the groove 4 and thereby transmit power to or from the pulley in the ordinary manner. Or if it be desired to use the pulley at the top of an oil derrick, it is mounted in any suitable manner with the bottom groove filled with the packing so as to form a suitable seat for the ordinary rope which is passed over the pulley and connected with the walking beam or other drill mechanism on one side and with the drill tool on the other. In this manner, the pulley will accommodate the ordinary fiber rope as satisfactorily as though the groove in the pulley were formed in a continuous and uniform structure, but when it is desired to substitute the wire cable for the rope, the packing can be quickly removed, as by cutting or untwisting the binding wires around it, and withdrawing the packing, when the pulley is ready for the reception of said cable. This avoids the necessity of making an entire change or substitution of pulleys as must generally be done where each pulley is only adapted to be used with the fibrous rope or the wire cable, as the case may be. After the pulley has thus been used for the wire cable and it is desired to again use it for the rope, as in starting a new well, the groove 4 is again filled with packing to the desired extent, which is secured therein as before, and the rope placed in the outer groove without any further change or alteration.

Having described my invention, I claim:—

1. A pulley having its periphery provided with a circumferential groove and a substantially U-shaped groove at the bottom thereof, the walls of the U-shaped groove at the point where they join the outer groove being at a distance apart, equal to or greater than the diameter of the groove at any other point toward the bottom thereof and a packing removably secured in the U shaped groove so as to entirely surround the pulley.

2. A pulley having its periphery substantially V-shape in cross section and provided with a circumferential groove at the bottom of the V, the walls of said pulley being provided with a plurality of perforations at a point between the mouth and the bottom of the U shaped groove, a yielding packing seated in said groove with its ends abutting against each other between said perforations, and clamps passed through said perforations in position for engaging with said abutting ends to hold the packing against circumferential movement.

In testimony whereof, I have hereunto set my hand at Los Angeles, California, this 21st day of February, 1908.

MILO A. BAKER.

In presence of—
FREDERICK S. LYON,
FRANK L. A. GRAHAM.